United States Patent
Pippen

(10) Patent No.: US 6,249,417 B1
(45) Date of Patent: Jun. 19, 2001

(54) ELECTRICAL CIRCUIT FOR PRODUCING A SUBSTANTIALLY CONSTANT PULSED MAGNETIC FIELD FOR REPELLING RODENTS

(75) Inventor: William T. Pippen, Orlando, FL (US)

(73) Assignee: Donald Hodgskin, Fern Park, FL (US)

( * ) Notice: Subject to any disclaimer, the term of this patent is extended or adjusted under 35 U.S.C. 154(b) by 0 days.

(21) Appl. No.: 08/844,977

(22) Filed: Apr. 23, 1997

(51) Int. Cl.[7] .................................................. A01M 1/22
(52) U.S. Cl. ........................ 361/139; 361/143; 327/181; 43/124
(58) Field of Search ..................................... 327/181, 447, 327/455; 361/139, 143, 152; 307/104; 116/22 A; 43/124

(56) References Cited

U.S. PATENT DOCUMENTS

| | | | |
|---|---|---|---|
| 4,097,838 | * 6/1978 | Fiala | 43/124 |
| 4,163,966 | * 8/1979 | Mounce | 43/124 |
| 4,178,578 | * 12/1979 | Hall | 43/124 |
| 4,219,884 | * 8/1980 | DeSantis | 43/124 |
| 4,802,057 | 1/1989 | Patterson et al. | 361/232 |
| 4,870,779 | * 10/1989 | Johnson et al. | 43/124 |
| 5,208,787 | * 5/1993 | Shirley | 367/139 |
| 5,473,836 | * 12/1995 | Liu | 43/124 |

* cited by examiner

Primary Examiner—Fritz Fleming
(74) Attorney, Agent, or Firm—James H. Beusse, Esq.; Holland & Knight, LLP

(57) ABSTRACT

An electrical circuit for producing a substantially constant pulsed magnetic field for repelling rodents includes an electromagnetic coil for generating a magnetic field in response to alternating current (AC) power applied to terminals of the coil and a gated triac connected in series electrical circuit with the coil for controlling application of AC electric power to the coil. A gating circuit develops a sequence of gating pulses for application to the triac with each of the gating pulses having a substantially constant voltage value extending for a time duration of a plurality of cycles of AC power for continuously exciting the coil with AC power during the extent of each gating pulse.

3 Claims, 2 Drawing Sheets

US 6,249,417 B1

ELECTRICAL CIRCUIT FOR PRODUCING A SUBSTANTIALLY CONSTANT PULSED MAGNETIC FIELD FOR REPELLING RODENTS

BACKGROUND OF THE INVENTION

The present invention relates to rodent repelling devices and, more particularly, to an improved circuit for generating a substantially constant electromagnetic field for repelling rodents.

Various electrical devices have been proposed to repel rodents such as rats and mice from buildings and other structures. One such device is disclosed in U.S. Pat. No. 4,414,653 in which sound waves are generated at a frequency which is irritating to rats and mice. Another form of such device is shown in U.S. Pat. No. 4,802,057 in which a magnetic field is generated with a pulse frequency of approximately 60 cycles per minute, which frequency is known to repel rodents such as rats and mice. The apparatus illustrated in the '057 patent is relatively complicated and requires a rectifier and voltage regulator for producing low voltage DC electrical power from AC electrical power connected to the device. A low voltage circuit generates a pulsed frequency gating signal which gating signal is then applied to an amplifier and from the amplifier to an optical isolator circuit which separates the low voltage circuit from the high voltage control circuit. The high voltage control circuit includes a switch connected in series between a magnetic coil and the AC power source. The switch is controlled by the gating signal passing through the optical isolator. However, the switch also requires more power than is available from the optical isolator and in that regard AC power is coupled through a current limiting resistor to a gate input of the switch. The gating signal from the optical isolator, is summed with AC power and utilized as a gating signal to the switch. During the time that the pulsed gating signal from the optical isolator is coupled to the switch, the AC power is used to gate the switch into and out of conduction. One of the detriments with this system is that the switch is operated at the AC power frequency, i.e., 60 cycles per second (60 Hz), even though the magnetic field is desirably operated at 60 cycles per minute or at a frequency of 1 Hz. Furthermore, due to the phase shift between the voltage and current caused by the inductance of the coil, the circuit produces a reduced power output since the AC gating signals are applied in synchronism with the applied AC voltage across the coil and such voltage is phase shifted from the actual current through the coil. It is believed that the gating of the switch using the 60 Hz AC power signal out of phase with the current through the coil is the cause of a power variation in the electromagnetic field generated by the device illustrated in the '057 patent.

SUMMARY OF THE INVENTION

The present invention is directed to an electrical circuit for energizing a coil for producing a substantially constant pulsed magnetic field. In an illustrative embodiment, the circuit includes an electromagnetic coil for generating a magnetic field in response to AC power applied to terminals of the coil. A gated triac is connected in series electrical circuit with the coil with the series circuit being connectable to a source of AC electric power. A gating signal is applied to a gate terminal of the triac to gate the triac into continuous conduction for a time duration such that a plurality of cycles of the applied AC power is applied across the coil. Preferably, the gating signals are generated at a frequency of 0.5 Hz with a 50% duty cycle so that gating pulses are applied to the gated triac at a rate of 30 pulses per minute with each pulse having a time duration of one second.

The gating pulses are generated by an integrated clock circuit. The clock circuit is timed by the 60 Hz AC power and produces output pulses at a 0.5 Hz rate that are on for three minutes and then off for three minutes. The power to the clock circuit is supplied through a series resistor and capacitor which act as a constant current source from the AC power. A zener diode regulates the positive half-cycle of the AC power to approximately 5.1 volts while shunting the negative half-cycle to ground. The pulsing DC level at the zener diode produces a conditioned 60 Hz clock signal which is applied to the integrated clock circuit for timing. This clock signal is also directed through a diode to a filter capacitor which establishes a unregulated low voltage DC level with AC ripple for powering the clock circuit. The output pulses from the clock circuit are applied as DC logic control signals to the gated triac. The triac controls the current through the coil and when gated into conduction allows the AC power to be applied across the coil for the full extent of the time duration of the gate pulse. A transient snubber circuit is connected across the triac. Since the coil is energized by both the positive and negative going AC power signals during the time duration of the clock pulse, the magnetic field generated by the coil remains substantially constant.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
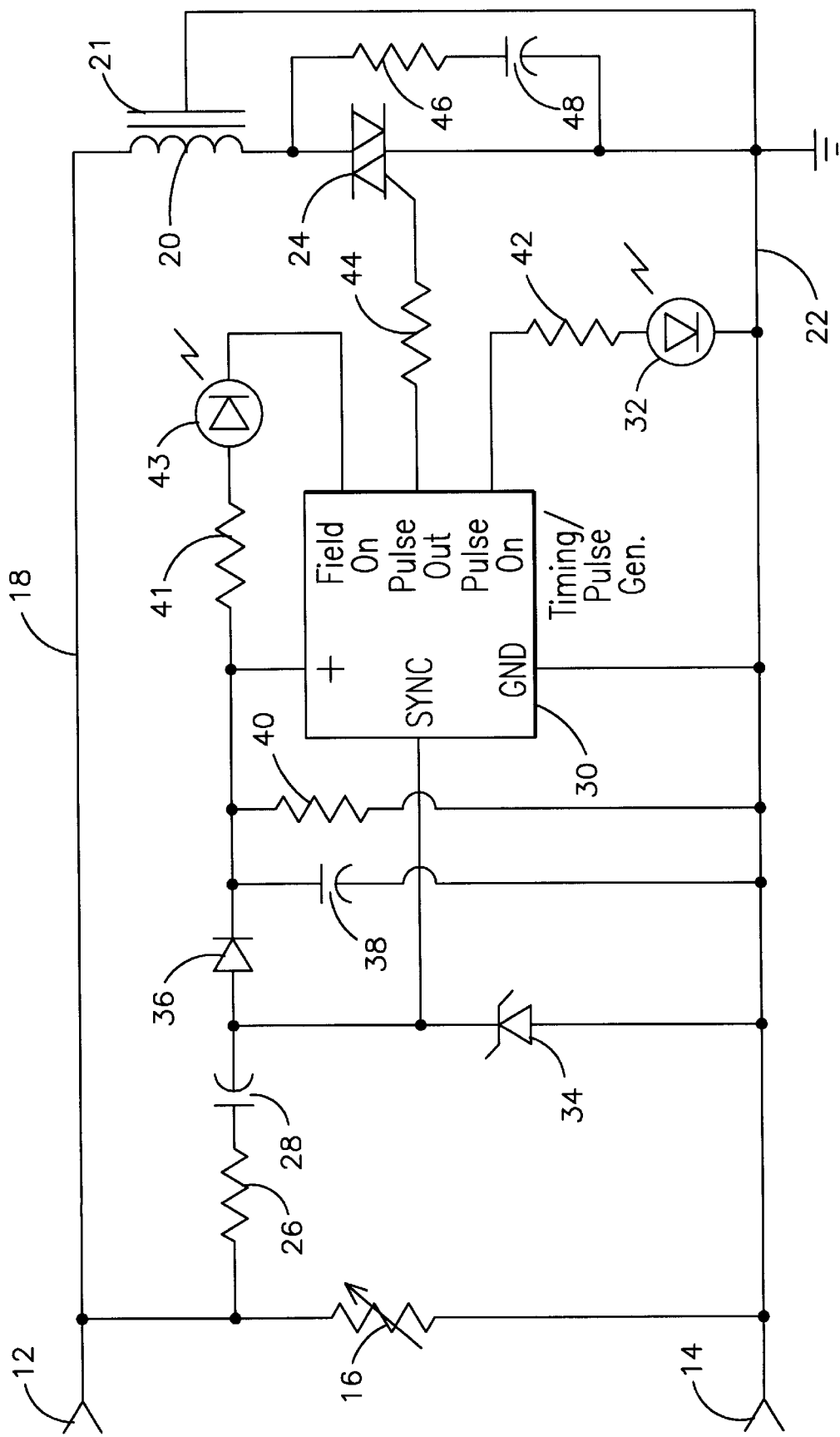
FIG. 1 is a schematic representation of a preferred embodiment of the present invention.

FIG. 1 illustrates a preferred embodiment of a circuit for energizing a coil so as to produce a substantially constant magnetic field. The circuit includes first and second input terminals 12 and 14 adapted for connection to a conventional 60 Hz, 120 volt utility power outlet. An MOV 16 connected across the input lines prevents transient voltages from damaging the circuit. The MOV 16 acts as a non-linear resistance with a fast response to current and voltage fluctuations. As will be described, the inventive circuit does not have power regulation and MOV 16 limits the effect of transients in the low voltage portion of the circuit. In addition, MOV 16 allows a lower rated resistor in the input circuit to minimize heat and size. The terminal 12 is connected via an AC bus 18 to one terminal of a magnetic coil 20 and the core 21 of the coil is connected to the electrically neutral (AC return) terminal of the AC source. The terminal 14 is connected to a ground bus 22. A triac 24 is connected in series between another terminal of the coil 20 and the ground bus 22. As will be apparent, when the triac 24 is gated into conduction, the AC power coupled to terminals 12 and 14 is applied across the coil 20. The circuit 10 includes the series combination of a resistor 26 and capacitor 28 connected between the input terminal 12 and a clock input terminal of an integrated clock circuit 30. The clock circuit 30 is a timing device synchronized to the AC waveform applied to the terminal 12 for providing gating pulses to drive the triac 24 and an additional output for supplying power to an LED 32 to indicate that the circuit is operating. Various types of clock circuits are well known in the art for generating timing signals synchronized to an external clock signal and the particular circuit arrangement for such clock circuits is not deemed a part of the present invention. The series resistor 26 and capacitor 28 act as a constant current source. A low voltage zener diode 34 is connected between ground lead 22 and the clock input terminal of circuit 30 in order to limit the voltage applied to the clock input terminal to a preselected low value such as, for example, 5.1 volts. The actual waveform appearing at the clock input terminal of the circuit 30 is indicated at A in FIG. 2. Note that the waveform has a clipped positive excursion and that the negative portion of the waveform has been shunted to ground through the diode 34.

Power for the circuit 30 is provided by the series combination of a diode 36 and capacitor 38 coupled in parallel with the zener diode 34. The diode 36 is poled to conduct current from the capacitor 28 to the capacitor 38. A bleeder resistor 40 is connected in parallel with the capacitor 38. When the circuit is plugged into a source of AC electric power, current through the diode 36 charges the capacitor 38 to approximately 4.5 volts. This voltage is then coupled to the circuit 30 as a DC source of voltage. While there is some ripple on the voltage on the capacitor 38, the magnitude of ripple voltage is not great enough to affect operation of the timer circuit 30. The resistor 40 provides a discharge path for the capacitor 38 when power is removed from the circuit 10. Power is also coupled through a current limiting resistor 41 and LED 43 to a FIELD ON terminal of timing circuit 30 for providing a visual indication that power is supplied to the system.

The integrated circuit 30 provides two separate outputs, a first output is a low power signal which is coupled through a resistor 42 to the LED 32. This output is present anytime that the circuit is plugged into a source of AC power and provides an indication that the circuit is powered and operating. A second output provides the gating pulses to the triac 24 and is coupled through a current limiting resistor 44 to a gate terminal of the triac 24. The triac 24 is a one amp, 400 volt gated triac manufactured by Teccor. The triac 24 controls the current through coil 20. Preferably, the coil should have a DC resistance of at least 2200 ohms in order to prevent the coil from becoming overly hot when the AC power is coupled to it. However, it may be desirable to maintain the resistance relatively close to a 2200 ohm value in order to avoid excessive cost associated with increasing the number of turns in the coil to raise its resistance. The coil 20 is a conventional wound coil having a ferromagnetic core 21 which is electrically connected to AC return line 22.

A snubber circuit comprising the series combination of a resistor 46 and capacitor 48 provides for transient protection during switching of the triac. The snubber circuit across the triac damps the inductive transients when power is removed from the coil, i.e., when the triac 24 is gated out of conduction. Inductive current in the coil 20 will transfer to a path through the snubber circuit and be dissipated in the resistor 46 in a conventional manner.

The following table is a list of component values for implementing the circuit as shown in FIG. 1.

| | |
|---|---|
| Resistor 26: 100Ω | Diode 34: IN4733A |
| Resistor 40: 10KΩ | Diode 36: IN4004 |
| Resistor 42: 330Ω | Triac 24: L401E3 |
| Resistor 44: 1KΩ | Coil 20: 2.2KΩ |
| Resistor 46: 100Ω | MOV 16: ERZ-V10D221 |
| Capacitor 28: 0.82 µf | |
| Capacitor 38: 470 µf | |
| Capacitor 48: 0.1 µf | |

Figure 2:
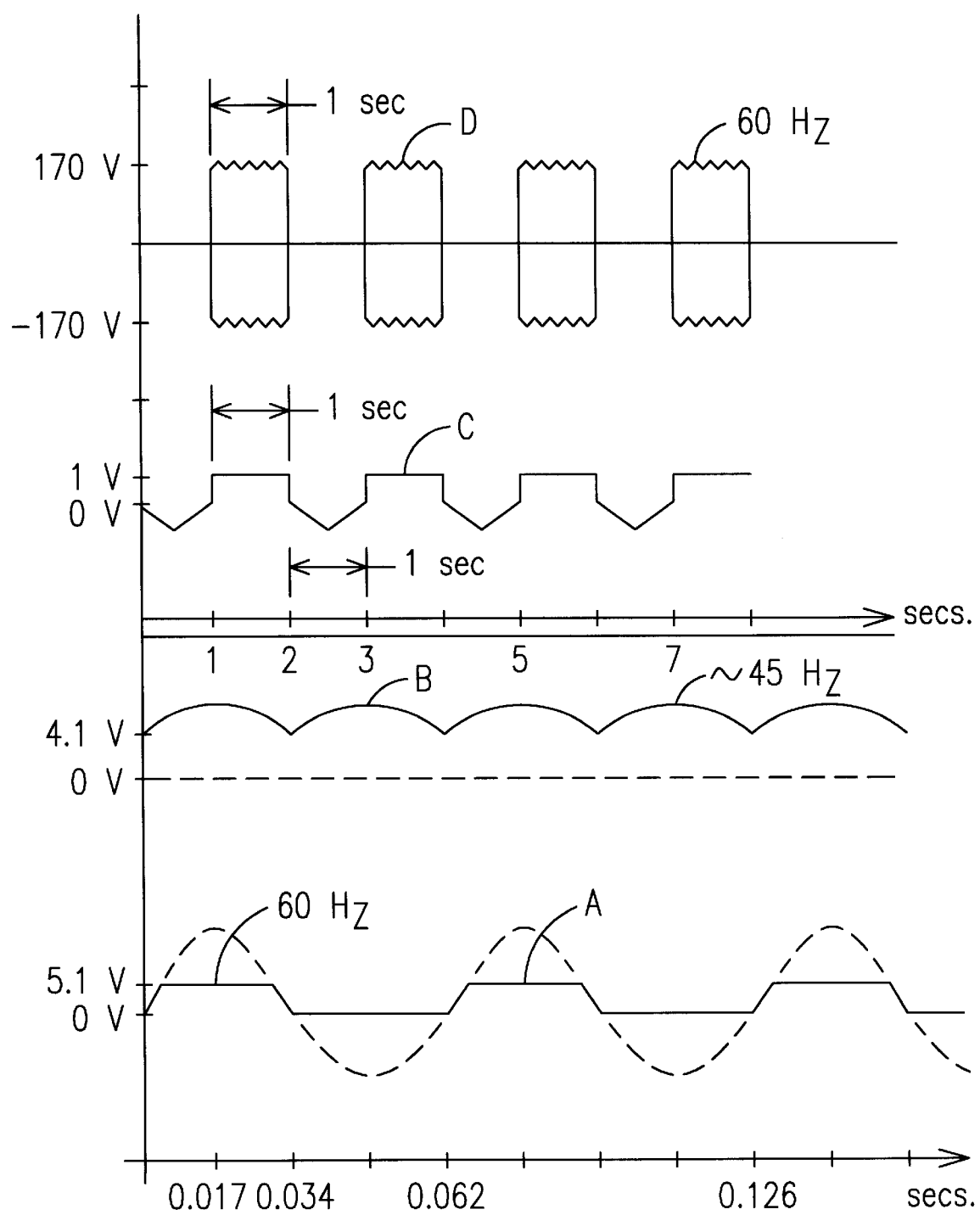
FIG. 2A is a graphical representation of the voltage appearing at the clock input terminal of the integrated clock circuit.
FIG. 2B is a graphical representation of the rectified voltage appearing at the DC input terminal of the integrated clock circuit.
FIG. 2C is a graphical representation of the gate signals produced by the integrated clock circuit and applied to the gate terminal of the triac.
FIG. 2D is a graphical representation of the voltage applied across the coil in response to each positive gate signal pulse.

Turning now to FIG. 2, when power is applied to the circuit of FIG. 1, the voltage appearing at the clock input terminal of the integrated clock circuit 30 appears as shown at graph A. Note that this circuit is a truncated half sinewave since the negative portions of the AC input waveform have been shunted to ground. The rectified voltage appearing at the DC input terminal of the circuit 30 is shown at graph B and is essentially a DC value with AC cycle ripple on the waveform. Graphs A and B are based on the 60 Hz line frequency even though graph B shows ripple voltage at about 45 Hz due to the capacitive effects of the circuit. Graphs C and D are on a different time scale which is compressed in FIG. 2 in order to show multiple cycles. The gate signals produced by clock circuit 30 and applied to the gate terminal of the triac 24 are shown at graph C. Note that the gate signals are at a frequency of 0.5 Hz and that each positive pulse which gates triac 24 into conduction is a continuous pulse for a full one second interval. This assures that the coil 20 is continuously excited during the pulse interval by the applied AC waveform. The graph shown at D is the voltage applied across the coil 20 in response to each positive gate signal pulse.

While the invention has been described in what is presently considered to be a preferred embodiment, various modifications and improvements may become apparent to those skilled in the art. It is intended therefore that the invention not be limited to the specific disclosed embodiment but be interpreted within the full spirit and scope of the appended claims.

What is claimed is:

1. An electrical circuit for producing a substantially constant pulsed magnetic field comprising:

an electromagnetic coil for generating a magnetic field in response to alternating current (AC) power applied to terminals of said coil;

a gated triac connected in series electrical circuit with said coil, said series circuit being connectable to a source of AC electric power; and gating means for developing a sequence of gating pulses for application to said triac, each of said gating pulses having a substantially constant voltage value extending for a time duration of a plurality of cycles of said AC power for continuously exciting said coil with said AC power during the extent of each said gating pulse;

said gating means including an input circuit for connection to said AC power and an integrated clock circuit for producing said gating signals, said input circuit having a first resistor, a first capacitor and a first zener diode serially connected in the recited order between first and second input terminals connectable to receive said AC power with said Zener diode being poled to establish a positive polarity at its juncture with said first capacitor, a junction intermediate said first capacitor and said Zener diode being connected to a clock input terminal of said integrated clock circuit, a combination of a diode connected in series circuit with a second capacitor with the combination connected in parallel with said Zener diode and said diode being poled to establish a positive polarity voltage on said second capacitor, a junction intermediate said diode and said capacitor being coupled to a reference voltage input terminal of said integrated clock circuit, said clock circuit providing said sequence of gating signals synchronized to said AC power signal applied to said clock input terminal, and a current limiting resistor coupling said gating signals from said clock circuit to a gate terminal of said triac.

2. The electrical circuit of claim 1 and including a light emitting diode coupled to receive signals from said clock for providing a visual indication of generation of gating signals for said triac.

3. The electrical circuit of claim 1 and including a snubber circuit connected in parallel circuit with said triac.

* * * * *